(12) United States Patent
Qi et al.

(10) Patent No.: US 7,853,274 B2
(45) Date of Patent: *Dec. 14, 2010

(54) WAKE-ON-WLAN FOR STATIONARY WIRELESS STATIONS

(75) Inventors: Emily H. Qi, Portland, OR (US); James Tsai, Beaverton, OR (US); Myron Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 622 days.

This patent is subject to a terminal disclaimer.

(21) Appl. No.: 11/714,356

(22) Filed: Mar. 5, 2007

(65) Prior Publication Data

US 2008/0220769 A1 Sep. 11, 2008

(51) Int. Cl.
*H04W 4/00* (2009.01)
(52) U.S. Cl. ............... 455/458; 455/500; 455/522; 455/517; 370/311; 370/318
(58) Field of Classification Search ....... 455/426.1, 455/458, 500, 502, 522, 517, 59; 370/346, 370/349, 310, 311, 312, 318, 328, 338
See application file for complete search history.

(56) References Cited

U.S. PATENT DOCUMENTS

| 7,020,102 B2* | 3/2006 | Tuomainen et al. ......... 370/311 |
| 2004/0227618 A1* | 11/2004 | Hwang et al. ............... 340/7.46 |
| 2005/0002346 A1* | 1/2005 | Bichot ........................ 370/312 |
| 2005/0037781 A1* | 2/2005 | Ozugur et al. .............. 455/458 |
| 2005/0049012 A1* | 3/2005 | Chang et al. ................ 455/574 |
| 2005/0232200 A1* | 10/2005 | Jeong et al. ................. 370/331 |
| 2006/0285526 A1 | 12/2006 | Jang et al. |
| 2007/0047562 A1 | 3/2007 | Sayeedi et al. |
| 2007/0076650 A1* | 4/2007 | Manjeshwar et al. ........ 370/328 |
| 2008/0119209 A1* | 5/2008 | Upp ............................ 455/458 |

FOREIGN PATENT DOCUMENTS

WO WO-2008/109413 A1 9/2008

OTHER PUBLICATIONS

WLAN Paging and Idle Mode, Sunghyun Choi, Jul. 13, 2006, IEEE 802.1106/0950r1, https://mentor.ieee.org/802.11/dcn/06/11-06-0950-00-000v-wlan-paging-and-idle-mode.ppt.*

(Continued)

*Primary Examiner*—Kamran Afshar
*Assistant Examiner*—Marisol Fahnert
(74) *Attorney, Agent, or Firm*—Cool Patent, P.C.; Kenneth J. Cool

(57) ABSTRACT

Stationary wireless network stations are woken up using Wake-on-WLAN functionality. Wake-on-WLAN is provided by paging stations in a wireless network. Paging may support mobile stations across multiple access points. Paging may also support stationary nodes with reduced overhead. Wake-on-WLAN is also provided to stationary stations in idle mode by signifying a wake-on event in a traffic indication map (TIM). Wake-on events may occur when a station is associated or disassociated with an access point. Upon receiving a wake-on event, a station associates or reassociates with an AP if necessary.

4 Claims, 14 Drawing Sheets

OTHER PUBLICATIONS

Na, J. H., et al., "Two Alternative Registration and Paging Schemes for Supporting Idle Mode in IEEE 802.16e Wireless MAN", *In: Vehicular Technology Conference*, 2006, VTC-2006 Fall.2006 IEEE 64th,(Sep. 2006),1-5 pp.

International Search Report and Written Opinion received for Application No. PCT/US2008/055451 mailed Jun. 24, 2008, 9 pgs.
International Preliminary Report on Patentability received for PCT Patent Application No. PCT/US2008/055451, mailed on Sep. 17, 2009, 2 pages.

* cited by examiner

| ELEMENT ID | LENGTH | PAGING GROUP ID = "0" | PAGING INTERVAL | DPIM COUNT | PAGING CONTROLLER ID (OPTIONAL FOR STATIONARY PAGING) |
|---|---|---|---|---|---|
| 1002 | 1004 | 1006 | 1008 | 1010 | 1012 |

FIG. 10

WAKE-ON-WLAN FOR STATIONARY WIRELESS STATIONS

FIELD

The present invention relates generally to wireless networks, and more specifically to wireless networks with stationary nodes.

BACKGROUND

Today's desktop and laptop computers may include wireless network interface cards (WNIC) to function as network nodes, or "stations," in wireless networks. Generally, these computers may be in either an "awake" power state or a "sleep" power state. In the awake power state, the WNIC and the remainder of the computer (host system) are both powered up and in an operational mode. In a sleep power state, power to the host system is shut off with state information suspended to disk/RAM, and the WNIC is powered off. Compared with an awake state, sleep states can significantly reduce power consumption; however, the computer is not able to receive wireless network traffic when in a sleep state since the WNIC is powered off.

Some network nodes in wired networks include a "wake-on-LAN" mechanism to enable the nodes to switch to an awake state from a sleep state when receiving a known packet pattern over a wired network. As "all wireless" enterprise campuses evolve, the enterprise may wish to implement the wake-on-LAN functionality in wireless networks. Unfortunately, known wake-on-LAN mechanisms are problematic in wireless networks for various reasons. For example, a WNIC may not be able to decrypt packets because the keys may have expired since keys stored in the WNIC cannot be refreshed while the system is sleeping. Also for example, an association between a station and access point may be lost while the WNIC is sleeping.

BRIEF DESCRIPTION OF THE DRAWINGS

FIG. 10 shows an example paging discovery message in stationary pagin embodiments;

DESCRIPTION OF EMBODIMENTS

Figure 1:
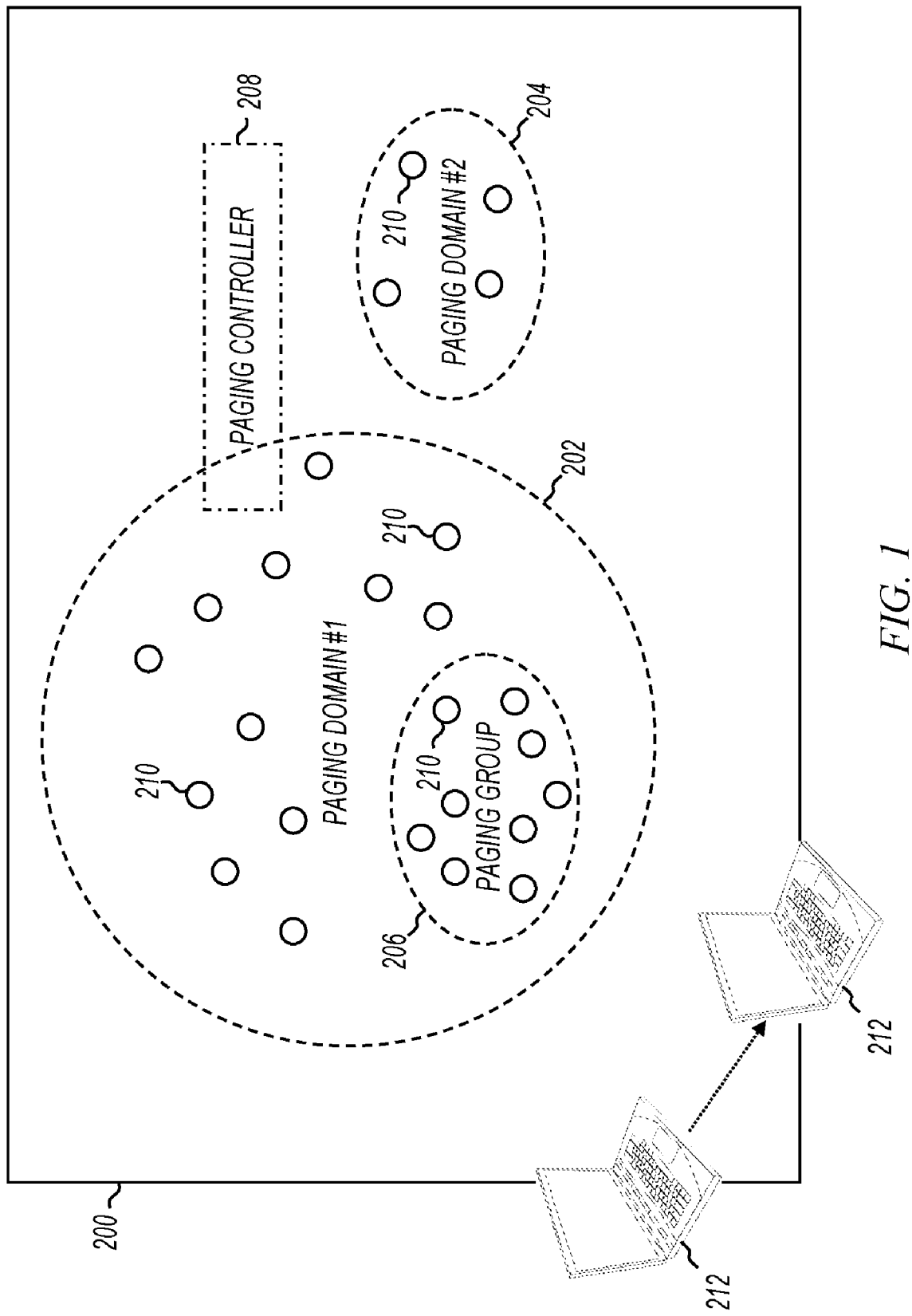
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Various embodiments of the present invention provide wake-on-WLAN functionality through paging of wireless network stations using paging indication messages (PIMs) and/or traffic indication maps (TIMs). This wake-on-WLAN functionality allows network resources to reach wireless network stations after the stations have been idle for a period of time. Various embodiments also provide wake-on-WLAN functionality when stations are not associated with an access point. Example applications of wake-on-WLAN functionality include IT night-time updates, remote access to corporate computers while working from home, and initiating video streaming to idle multimedia servers. The remainder of this specification describes wake-on-WLAN functionality provided through paging of mobile and stationary wireless network nodes using PIMs and/or TIMs.

Wake-On-WLAN of Mobile Wireless STAs Using PIM

Mobile network nodes stations (STA) may roam from one access point (AP) to another. This section describes paging of mobile stations that may move among APs. Generally, a station (STA) within the network enters an idle state referred to as "paging mode" and emerges from the idle state when paged. The STA "awakens" prior to a paging interval (advertised by a paging controller) during which paging messages including paging indication messages (PIM) are broadcast, and is ready for being paged by the paging controller when there is incoming packets. In some embodiments, the STA disassociates from all APs when entering paging mode. When paged, the STA reassociates with the most previously associated access point, or associates with a new access point.

Referring to FIG. 1, a paging architecture for a network 200 in accordance with various embodiments of the present invention is schematically illustrated. The paging architecture includes, for example, a first paging domain 202, a second paging domain 204, a paging group 206, and a paging controller 208. Network 200 may include any number of paging domains and paging groups without departing from the scope of the present invention.

In some embodiments, network 200 is a wireless local area network (WLAN). For example, one or more of mobile stations 212 or access points 210 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

The paging domain comprises one or more APs 210. The paging domain has a unique paging domain identification (ID), thereby allowing an STA 212 to identify the paging domain with which it is associated.

The paging group is within the paging domain and includes a list of APs that are near the STA. In one exemplary embodiment of the present invention, the paging group is the same as the Neighbor Report defined in IEEE 802.11K (2004). A paging group may overlap multiple paging domains such that it is within one or more paging domain.

The paging controller is responsible for managing paging functionality such as location updates, and for responding to paging requests and/or broadcasting paging messages that include PIMs. The paging controller maybe co-located with a location server (such as GPS) and/or a wireless router that is capable of buffering incoming packets and configuring a paging message from the paging controller.

A paging protocol is defined in accordance with various embodiments of the present invention. The paging protocol provides messages that enable a paging mechanism in a wireless network that includes multiple access points. Examples of various messages include paging discovery messages, paging registration messages, configuration messages, location update messages, paging command messages, paging messages, and PIMs.

A paging proxy is also defined in accordance with various embodiments of the present invention. The paging proxy is responsible for relaying paging protocol messages between the paging controller and STA. The paging proxy is also responsible for buffering incoming packets for the STA when it is in a paging mode, and triggering a PIM from the paging controller for a given STA.

Figure 2:
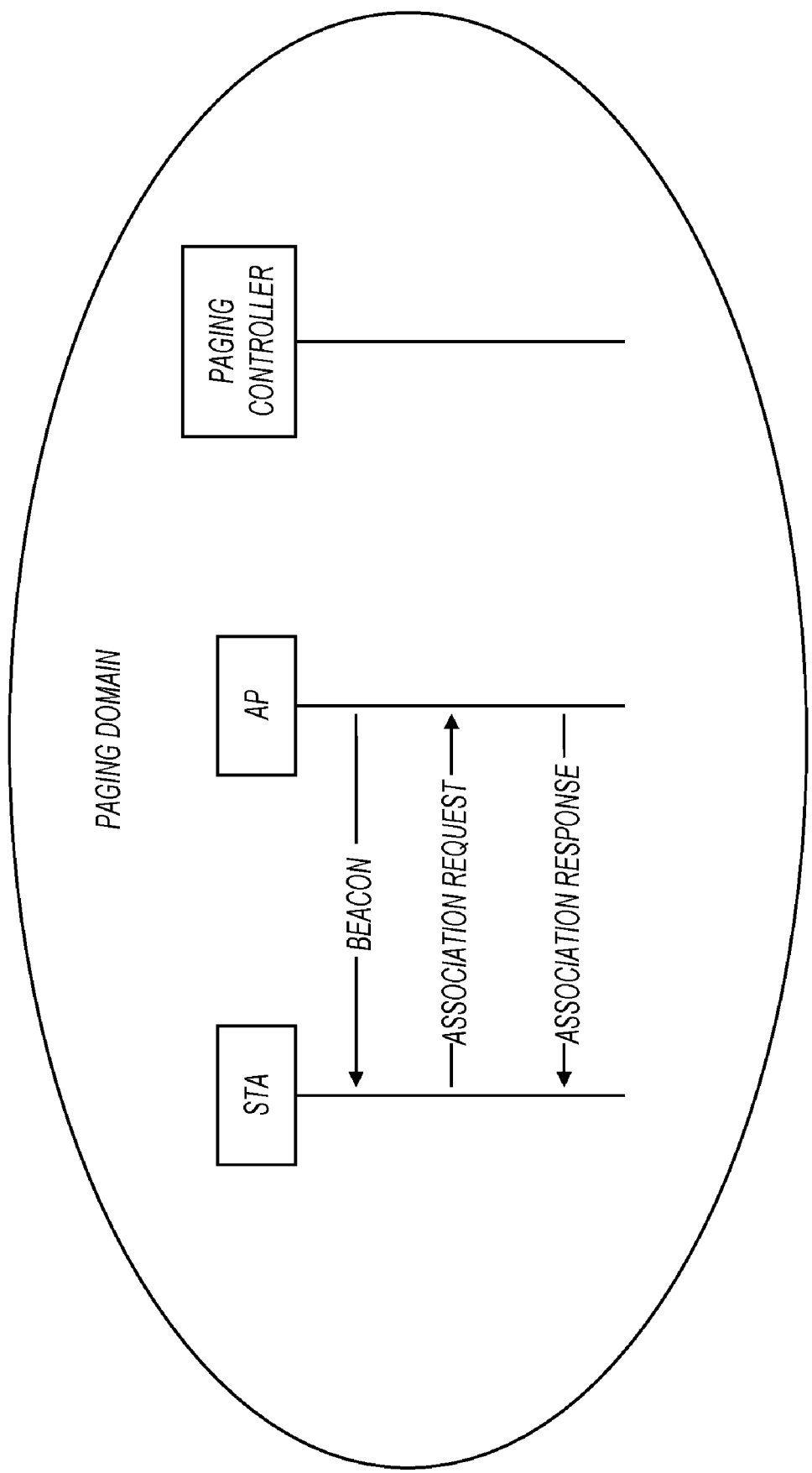
FIG. 2 shows message flow in a wireless network.

Referring to FIG. 2, an example of paging discovery messages and the message exchange flow, in accordance with various embodiments of the present invention, is described. An STA enters a network including at least one paging domain and receives beacons from one or more APs within a paging domain. These beacons include paging discovery messages to advertise the paging functionality available to STAs within range.

Figure 3:
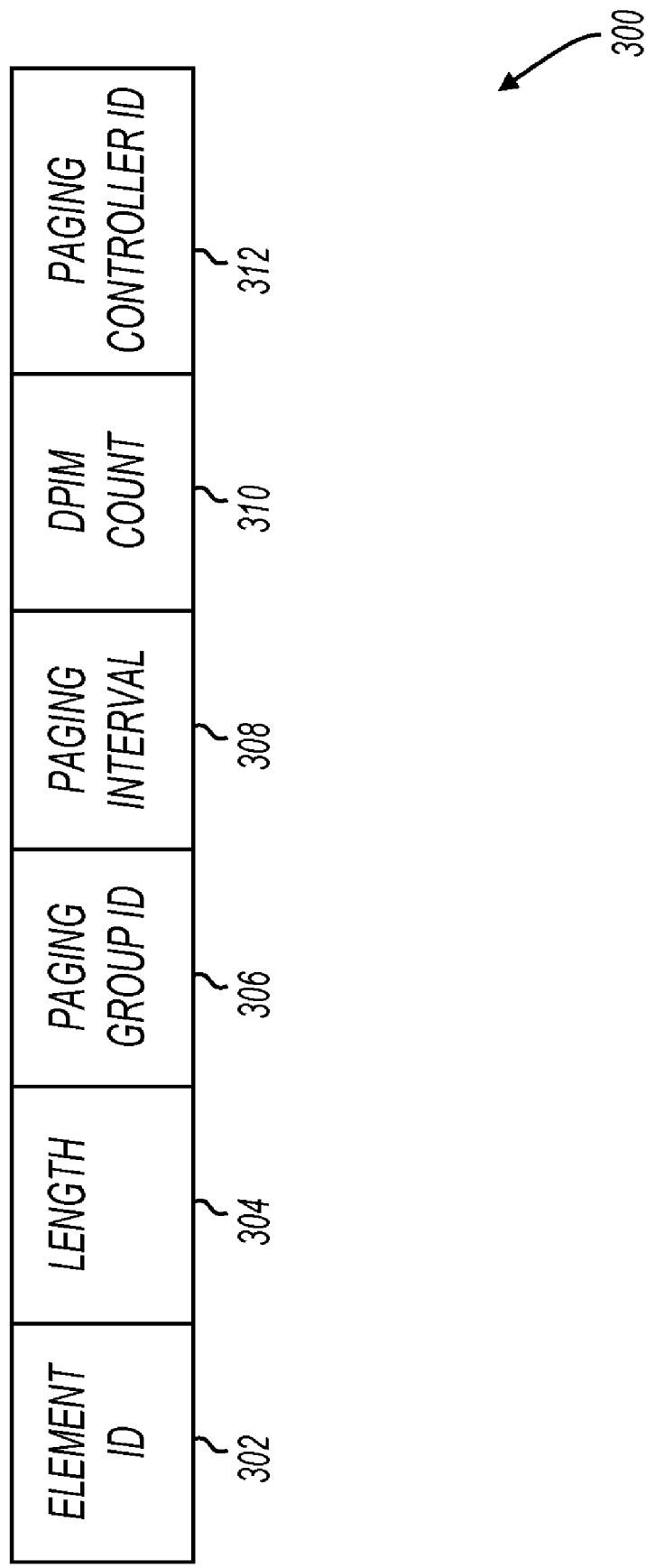
FIG. 3 shows an example paging discovery message in mobile paging embodiments.

FIG. 3 shows an example paging discovery message in mobile paging embodiments. Message 300 includes element ID 302, length field 304, paging group ID 306, paging interval 308, DPIM count 310, and paging controller ID 312. Element ID 302 and length field 304 are overhead fields for packet management. Paging group ID 306 identifies the paging group to which the broadcasting AP belongs, and paging interval 308 is a predetermined time interval during which paging messages are sent. DPIM count 310 includes a count value that identifies when the next PIM will be sent, and paging controller ID 312 identifies the paging controller that services the paging group to which the AP belongs.

Referring now back to FIG. 2, the STA transmits an association request to a selected AP and the AP responds confirming association. The STA is now associated with this particular paging domain and paging group, and the AP is now the AP paging proxy.

Figure 4:
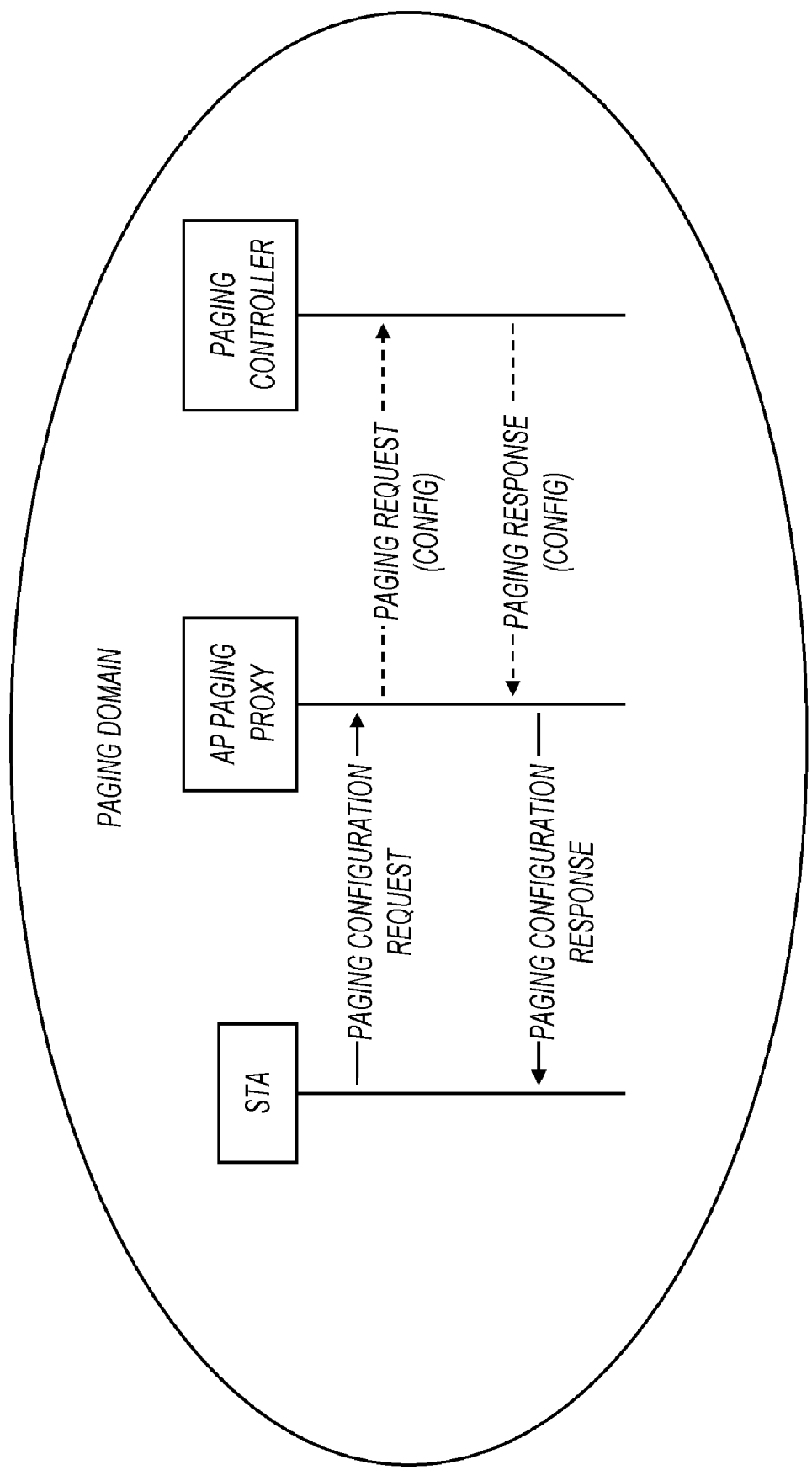
FIG. 4 shows message flow in a wireless network.
Figure 5:
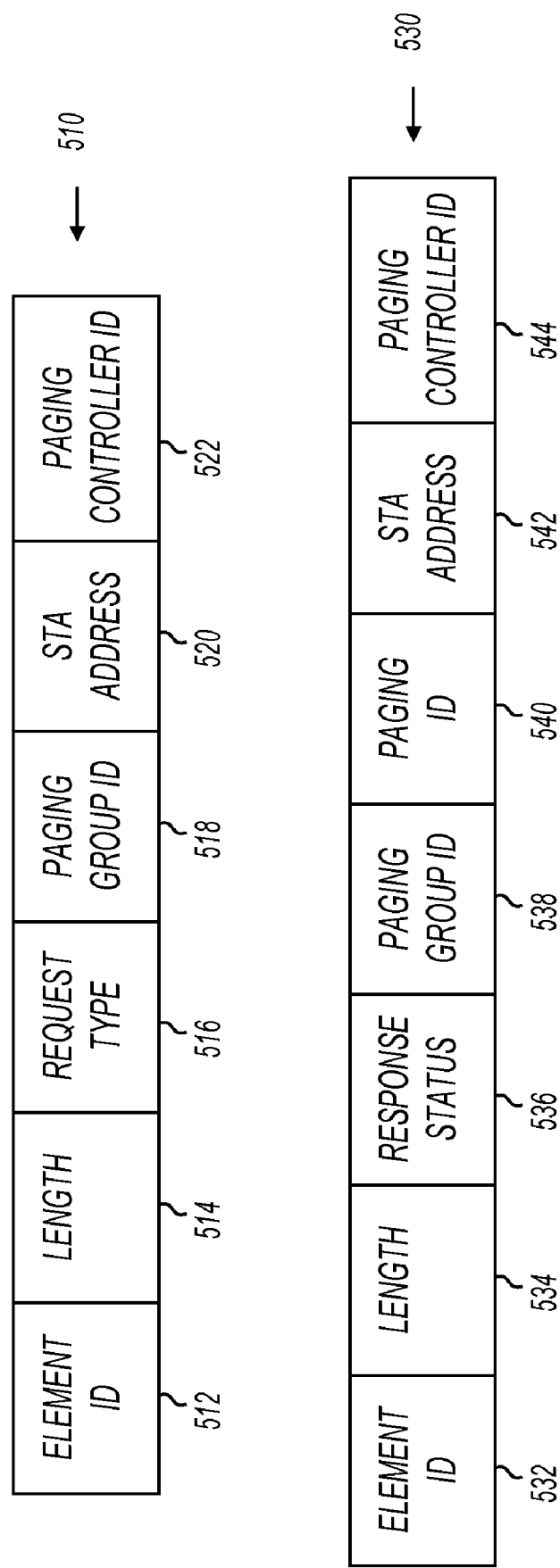
FIG. 5 shows example paging configuration communications.

Referring to FIGS. 4 and 5, examples of configuration messages and their transmission, in accordance with various embodiments of the present invention, are described. The paging configuration request/response cycle is used to register the STA with the paging service, after which the STA is put in an "idle" state.

An example paging configuration request is shown at 510 in FIG. 5. Request 510 includes element ID 512, length field 514, request type 516, paging group ID 518, STA address 520, and paging controller ID 522. Element ID 512 and length field 514 are overhead fields for packet management. Request type 516 identifies the type of request and paging group ID 518 specifies the paging group that the STA is a part. STA address 520 identifies the station sending the request. In some embodiments, the STA address may correspond to the media access control layer (MAC) address of the station. Paging controller ID 522 specifies the paging controller that the STA expects to control the paging.

An example paging configuration response is shown at 530 in FIG. 5. Response 530 includes element ID 532, length field 534, response status 536, paging group ID 538, paging ID 540, STA address 542, and paging controller ID 544. Element ID 532 and length field 534 are overhead fields for packet management. Response status 536 provides information from the AP and/or paging controller regarding the status of the configuration request. Paging group ID 538 specifies the paging group to which the STA is assigned. Paging ID 540 is an ID assigned to the STA. During paging operations, the paging ID specifies which STA is being paged. STA address 542 echoes STA address 520, and paging controller ID 544 specifies the paging controller to which the STA has been assigned.

In addition to the information shown in FIG. 5, through registration with the service, the STA may acquire paging key information for securing paging messages, and paging interval information, if not previously provided. The AP paging proxy receives the configuration message and exchanges this information with the paging controller after a successful association or re-association of the STA with the AP paging proxy. Thus, the STA sends a configuration message requesting paging registration to the AP paging proxy, which forwards it to the paging controller. The paging controller sends a paging response message back to the AP paging proxy, which forwards it to the STA. The STA is now registered with the paging controller for paging service.

At this point, the STA is put in an idle state, also referred to herein as "paging mode." The STA may disassociate with an AP and enter a low power state while in paging mode. The STA awakes to receive paging messages in PIMs as described further below.

Figure 6:
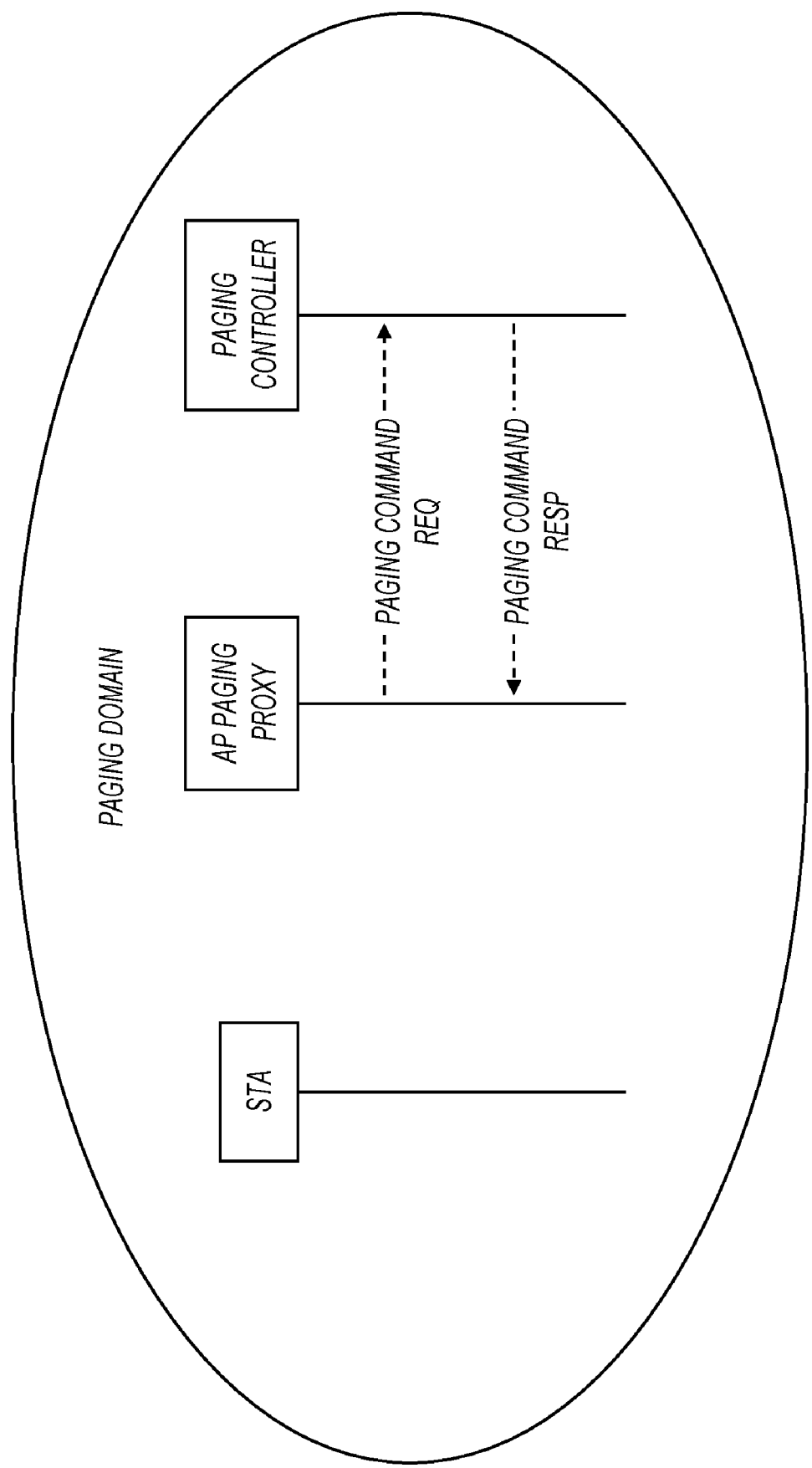
FIGS. 6-8 show message flow in a wireless network.

Referring to FIG. 6, an exemplary flow of messaging for paging command messages, in accordance with various embodiments of the present invention, is described. The paging command messages are used by the AP paging proxy. The AP paging proxy uses the messages to query the paging controller for a given STA's paging status. The AP paging proxy may also send a paging command message to trigger a paging message to be sent to the STA from the paging controller to page the STA. For example, if the STA has exited the paging mode and wishes to see if it has been paged without waiting for the next paging interval, the AP proxy may send a paging command message.

Figure 7:
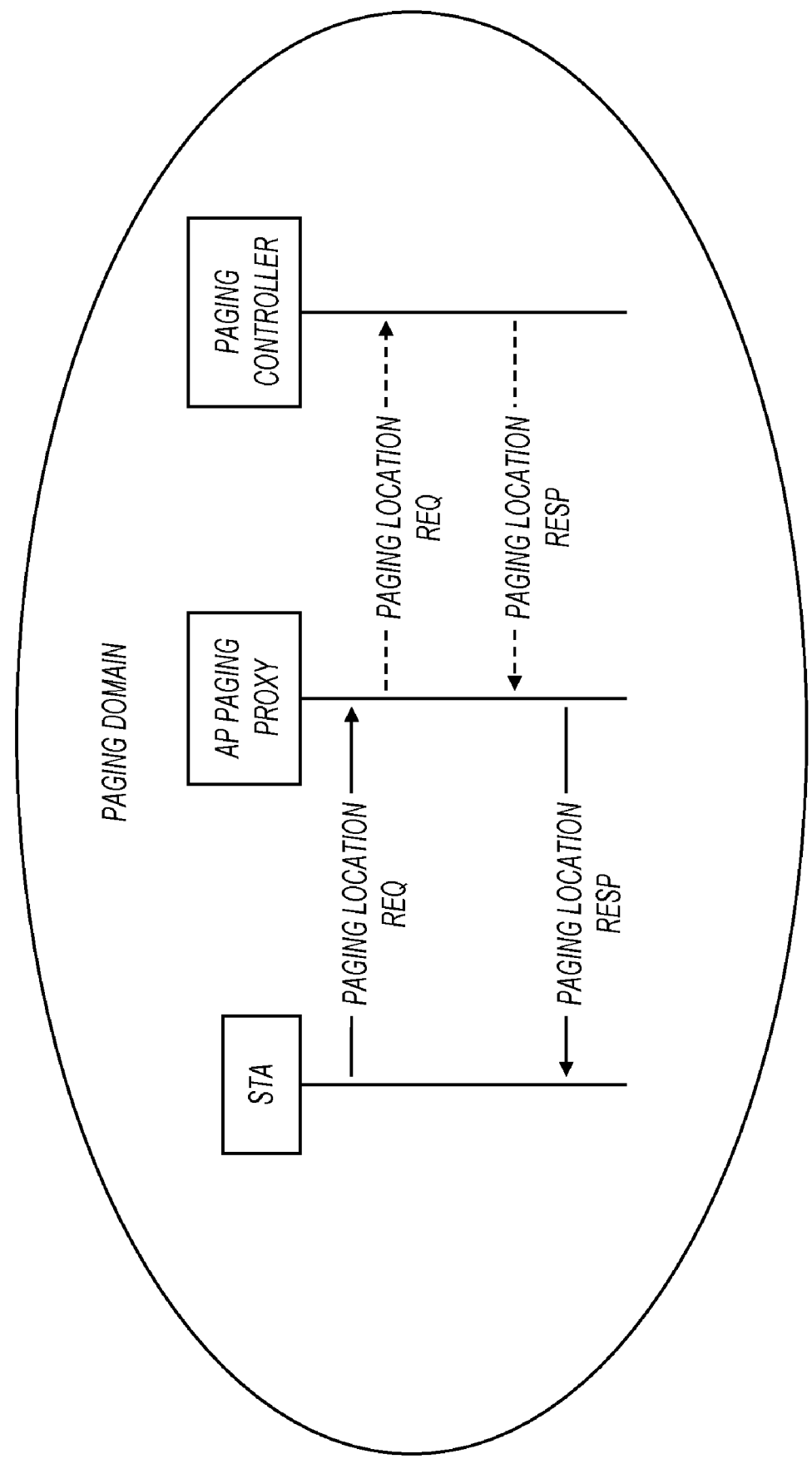

Referring to FIG. 7, an example of location update messages and the message exchange flow, in accordance with various embodiments of the present invention, is described. The STA uses such a message to inform the paging controller regarding its current BSS ID or BSS ID set (a list of APs in the neighbor report). The STA may, for example, send a location update message when it determines that the current BSS ID is different from the last BSS ID, thereby indicating that the STA has moved and is within a new paging group and/or a new paging domain or even a new network. The STA associates with a new AP and reconfigures its paging context (keying material and paging controller ID, if the paging controller ID has also changed). In accordance with one embodiment of the present invention, the paging controller maintains a location update timer associated with the STA. If the STA does not update its location with the paging controller within a predetermined amount of time, the paging controller will remove the STA from its paging STA list, as it will assume that the STA has left the paging domain or domains controlled by the paging controller.

Figure 8:
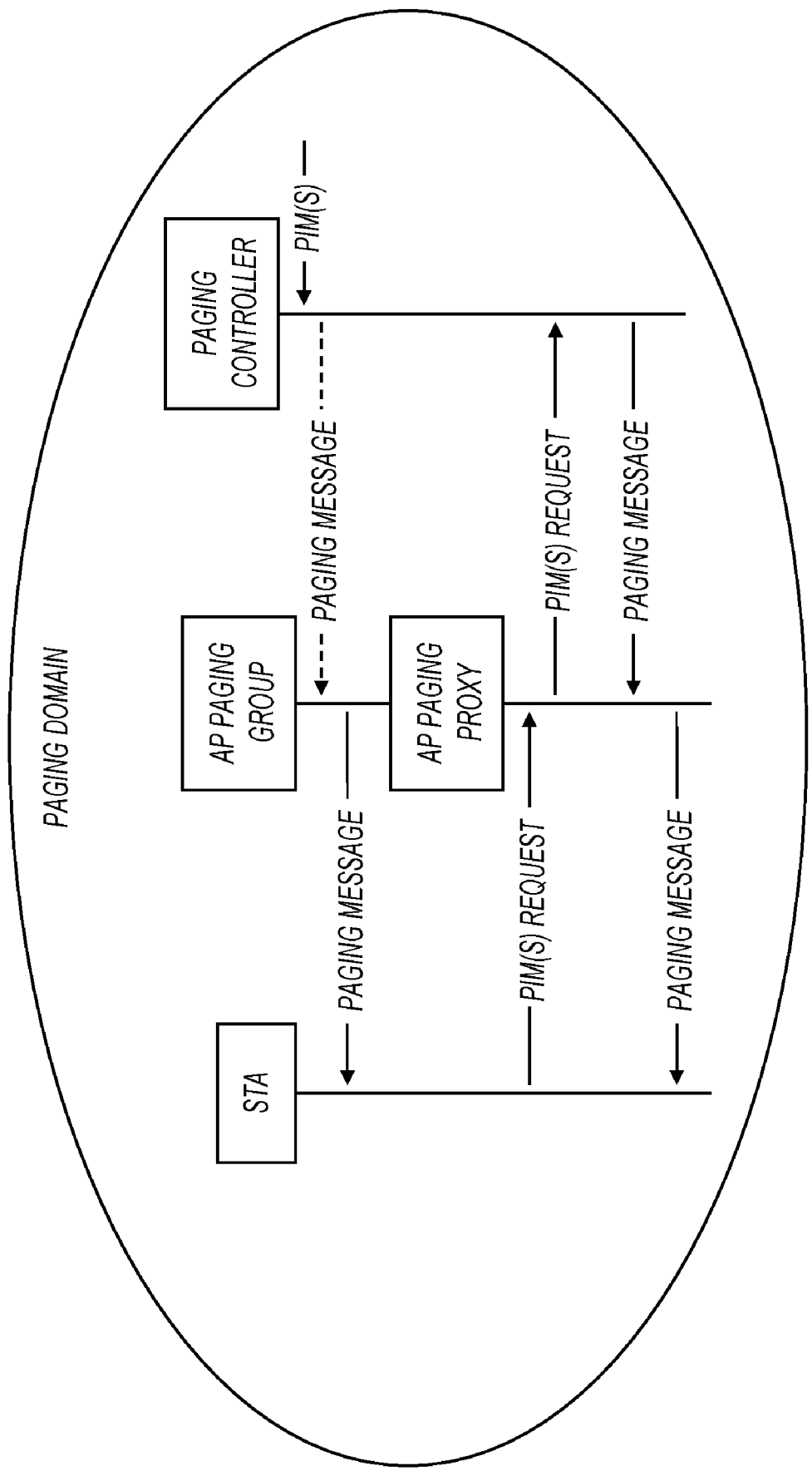

Referring to FIG. 8, an example of paging messages and the message exchange flow, in accordance with various embodiments of the present invention, may be described. Paging messages are sent from the paging controller to an AP or a set of APs within a paging group during each paging interval. Each paging message may contain zero or more PIMs within a packet. In some embodiments, the PIM includes a series of bit locations, where each bit location corresponds to a paging ID. Stations having their corresponding bit set in the PIM have been paged. In other embodiments, a PIM includes messages containing the paging ID and any other paging-necessary information for the STA. If there is more than one PIM for the STA within a paging interval, the paging controller packs all the PIMs with their respective arrival order in one paging message. The paging message is encrypted with an individual STA paging key.

Once an STA enters the paging mode, the STA may exit the paging mode prior to each paging interval, or prior to a paging interval after more than one paging interval has passed, to receive paging messages. The exit may be automatic or may be triggered by a user. The STA checks the paging message from the AP(s) for any PIMs and decrypts the PIMs to determine if it indeed has been or is being paged. If the paging message do not include any PIM(s) for the STA, indicating that the STA has not been paged, it may re-enter the paging mode. If however the paging message includes any PIM(s) for the STA, thereby indicating that the STA has indeed been paged, the STA may re-associate with the AP paging proxy if the STA has not moved enough to warrant a change. Alternatively, the STA may associate with a new AP, a new paging domain if needed, and even a new paging controller if needed.

Figure 9:
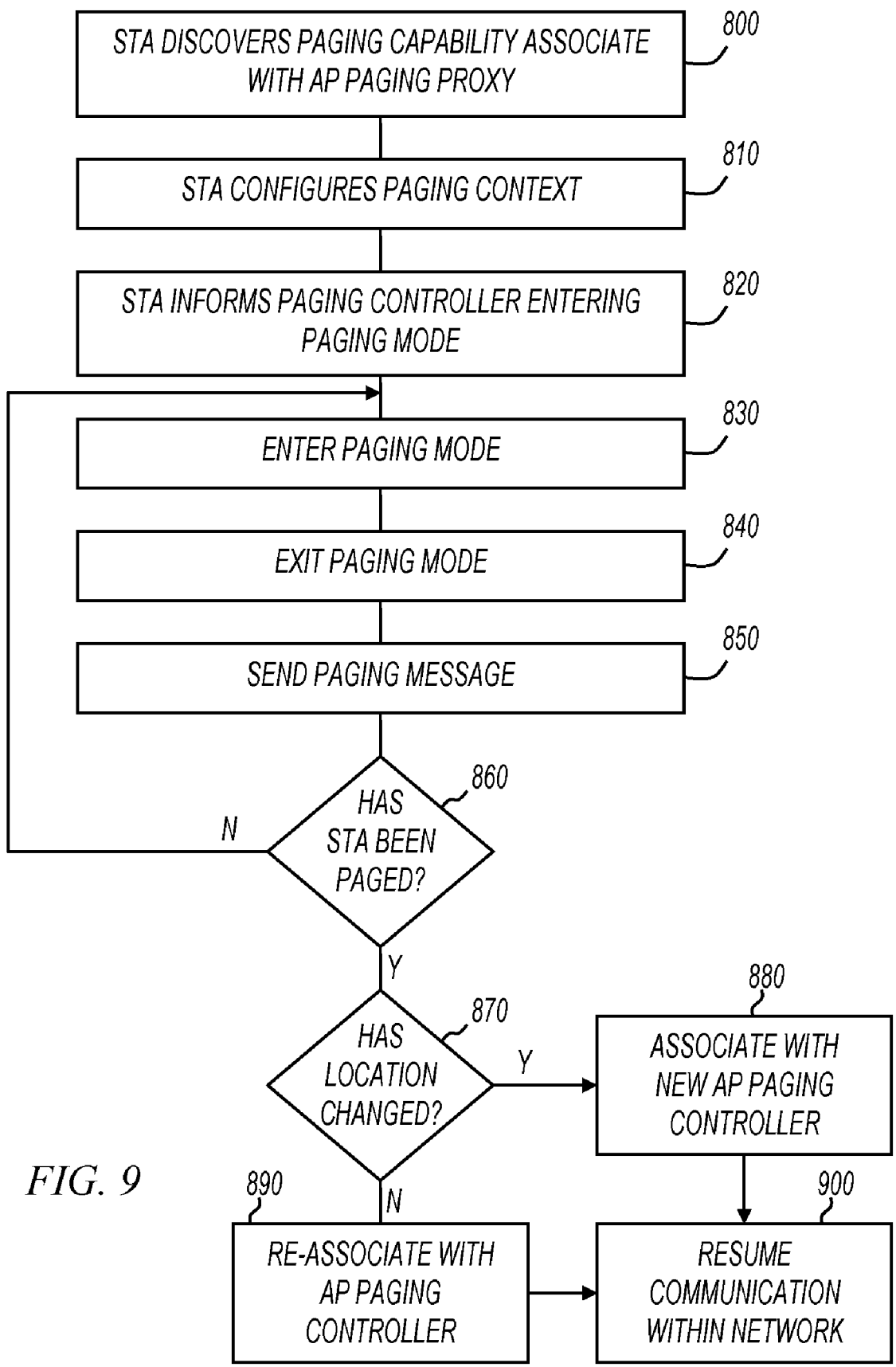
FIG. 9 shows a flowchart in accordance with various embodiments of the present invention.

Thus, with reference to FIG. 9, an exemplary operation for a paging mechanism, in accordance with various embodiments of the present invention, may include, at block 800 an STA discovering, during a network entry procedure for the STA, that the wireless network supports the paging mechanism by receiving beacons, for example, from one or more APs. The STA associates with a paging domain and AP paging proxy. At block 810, the STA may configure a paging context (paging domain key, paging ID, paging domain ID, and/or paging interval). The STA may configure the paging context via one or more configuration messages exchanged with an AP and associates with a paging domain and an AP paging proxy, which is part of a paging group. The STA may decide to enter a paging mode and may inform the paging controller, via the AP paging proxy, by either sending a configuration message or a location update message at block 820. Upon receiving an acknowledgement back from the paging controller, via the AP paging proxy, the STA enters the paging mode at block 830. Generally, this includes powering off its MAC layer and PHY layer. When paging is needed, the paging controller determines the paging group through which the STA may be paged based upon the STA's last known location. The STA exits the paging mode prior to the paging interval at block 840. The paging controller sends a paging message to at least one AP of the list of paging group APs at block 850. The paging group APs relay and broadcast the paging messages during the paging interval and the STA receives. The STA checks the paging message for any PIMs and decrypts them to see whether there are any PIM(s) intended for it indicating that it has indeed been paged at block 860. As noted at blocks 870-900, if the STA has been paged, the STA re associates with an AP, either the original AP paging proxy if the STA hasn't moved enough to warrant a change or with a new AP, and resumes communication within the network. If it hasn't been paged, it may re-enter the paging mode.

Wake-On-WLAN of Stationary Wireless STAs Using PIM

These wake-on-WLAN embodiments for stationary STAs extend the idle mode and paging scheme described above with reference to mobile stations. In general, a stationary STA is one that rarely, if ever, associates with more than one access point. For example, a stationary STA may be a desktop computer with a wireless network interface card (WNIC). The stationary STA paging embodiments exploit the stationary nature of the STA to simplify the interactions between STA, AP, paging proxy, and paging controller.

As described above with reference to the mobile station embodiments, access points advertise paging capabilities in beacons. In some embodiments, an access point may advertise the ability to provide a stationary paging service in paging discovery messages.

FIG. 10 shows an example paging discovery message in stationary paging embodiments. Message 1000 includes element ID 1002, length field 1004, paging group ID 1006, paging interval 1008, DPIM count 1010, and paging controller ID 1012. Element ID 1002 and length field 1004 are overhead fields for packet management. Paging group ID 1006 identifies the paging group to which the broadcasting AP belongs, and paging interval 1008 is a predetermined time interval during which paging messages are sent. DPIM count 1010 includes a count value that identifies when the next PIM will be sent, and paging controller ID 1012 identifies the paging controller that services the paging group to which the AP belongs.

As shown in FIG. 10, certain fields are optional when only stationary paging is supported by the AP transmitting the beacon. The optional fields include the paging controller ID because the access point may function as the paging controller. In embodiments that support both mobile and stationary paging embodiments, the optional fields are included. When advertising stationary paging support, the AP includes the paging group ID with a value of zero. Values other than zero may be used to indicate stationary paging support.

If there is no outgoing traffic and no active application, a stationary device may enter the idle state (paging mode). When the stationary STA wishes to enter the idle state, the STA sends a paging configuration request as described above with reference to FIG. 4, although the format of the request may differ based on the existence of stationary paging support. Similarly, the access point may provide a response to the request. Again, the request may differ from that described above based on the existence of stationary paging support. Example stationary paging embodiments of configuration requests and responses are shown in FIG. 11.

An example stationary paging configuration request is shown at 1110 in FIG. 1. Request 1110 includes element ID 1112, length field 1114, request type 1116, paging group ID 1118, STA address 1120, and paging controller ID 522. Element ID 1112 and length field 1114 are overhead fields for packet management. Request type 1116 identifies the type of request and paging group ID 1118 specifies the paging group that the STA is a part. STA address 1120 identifies the station sending the request. In some embodiments, the STA address may correspond to the media access control layer (MAC) address of the station. Paging controller ID 1122 specifies the paging controller that the STA expects to control the paging.

Figure 11:
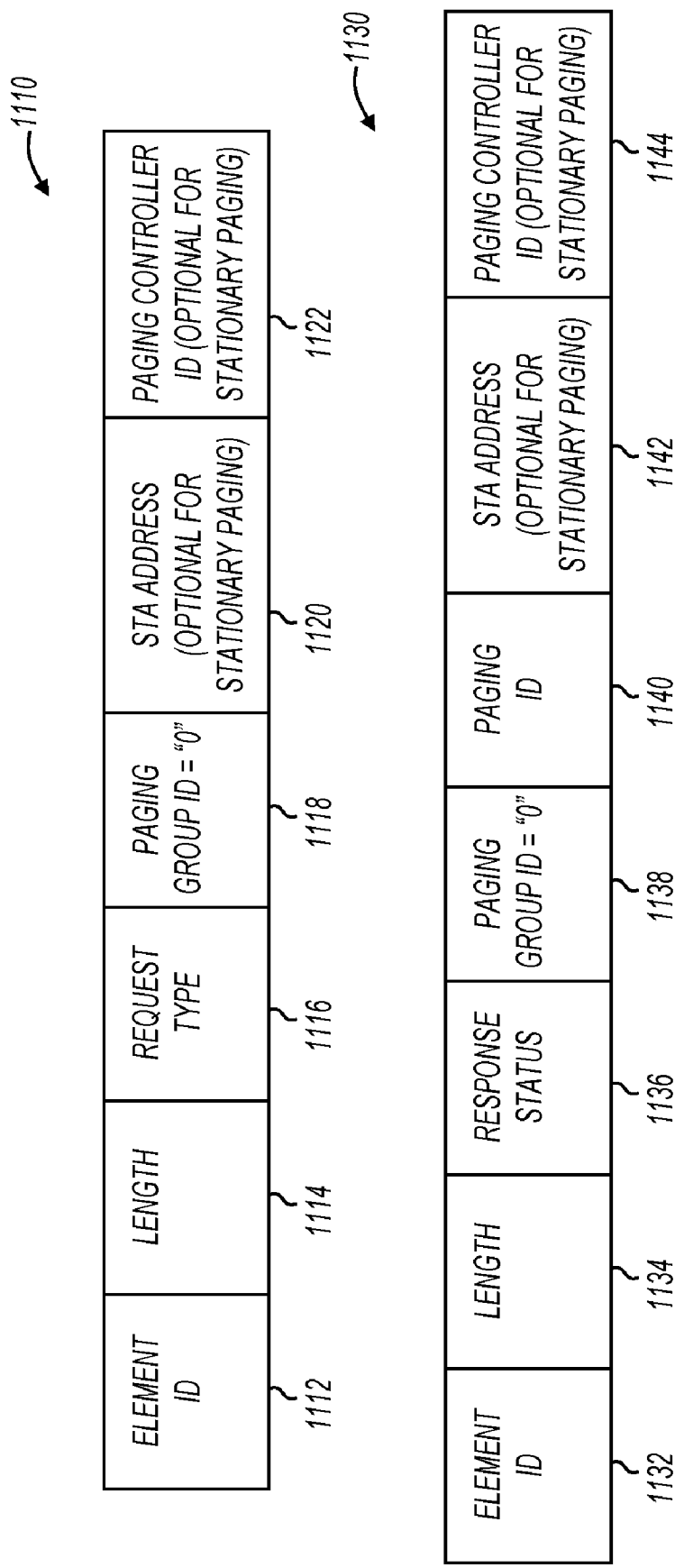
FIG. 11 shows example paging configuration communications.

An example paging configuration response is shown at 1130 in FIG. 11. Response 1130 includes element ID 1132, length field 1134, response status 1136, paging group ID 1138, paging ID 1140, STA address 1142, and paging controller ID 1144. Element ID 1132 and length field 1134 are overhead fields for packet management. Response status 1136 provides information from the AP and/or paging controller regarding the status of the configuration request. Paging group ID 1138 specifies the paging group to which the STA is assigned. Paging ID 1140 is an ID assigned to the STA. During paging operations, the paging ID specifies which STA is being paged. STA address 1142 echoes STA address 1120, and paging controller ID 1144 specifies the paging controller to which the STA has been assigned.

In some embodiments, the STA sends the configuration request with the paging group ID set to zero. The value of paging group ID zero indicates that the device is stationary and the paging service can page the STA within the current associated AP area. When the paging group ID is set to zero, the STA address field and paging controller ID field are optional fields as the current AP will be the paging server.

The AP (Paging Server) will assign a paging ID 1140 to be used as a wake-on ID. The AP sends a configuration response to the requesting device including a paging ID and a paging group ID with the value of zero. The STA address field and paging controller ID fields are optional.

In addition to the information shown in FIG. 11, through registration with the paging service, the STA may acquire paging key information for securing paging messages, and paging interval information, if not previously provided. The STA is now registered with the paging controller for paging service.

At this point, the STA is put in an idle state, also referred to herein as "paging mode." The STA may disassociate with the AP and enter a low power state while in paging mode. The STA awakes to receive paging messages in PIMs as described further below.

In operation, the STA wakes up every paging interval to check a paging indication message (PIM) to see whether there is wake-on event for the STA. If there is directed traffic for the STA, AP will wake up STA via the PIM using the paging ID. The AP maintains the idle state for idle mode STA until the AP receives an exit idle mode request from the STA, or unsuccessful paging operation. If the AP tries to page or wake the STA, but the STA doesn't respond with an exit idle mode request frame, the AP may decide not to maintain the idle mode status for the STA any more.

When the idle mode STA receives a page, the idle mode STA will wake up the host system. The idle mode STA will send an exit idle mode request to the AP to exit idle mode. If the STA's key or association has been expired, the idle mode STA will send re-association request and piggyback the exit idle mode request in the re-association request.

Wake-On-WLAN of Stationary Wireless STAs using TIM

In these embodiments, a traffic indication map (TIM) is used to provide wake-on-WLAN functionality even after a STA is no longer associated with an access point. For example, a previous association ID may be preserved for stations that are no longer associated. When an AP desires to wake a stationary STA, the appropriate bit is set in the TIM to indicate traffic is waiting. This is done whether the station is currently associated or disassociated with the access point. The ID used to identify the stationary STA is referred to as the wake-on ID. The wake-on ID can be any suitable identifier, including the STA's current association ID at the time the station enters idle mode.

The STA wakes up every wake-on interval to see whether there is a wake-on event for the STA. The wake-on interval is expressed as a multiple of beacon intervals, and may be a relatively large number. For example, in normal operation when the STA is awake, the STA may listen for each TIM to check for traffic. In contrast, when the STA is in idle mode, the STA may only wake every few minutes or every few hours to check for a wake-on event in the TIM. In some embodiments, the wake-on interval may be the renegotiated Listen Interval for the idle mode station (Idle Mode listen interval).

If there is no outgoing traffic, and no active application, a stationary device may enter the idle state to save power. The STA sends an idle mode request including a suggested wake-on interval field to the associated AP. The associated AP will respond with an idle mode response including the AP recommended wake-on interval. In some embodiments, the AP uses the current association ID as the wake-on ID and keeps the association ID valid for the STA until the STA exits from idle mode. Once the STA receives the idle mode response, the STA enters the idle mode. In some embodiments, the STA may intentionally disassociate upon entering the idle mode. In other embodiments the STA may remain associated upon entering the idle mode, but may become disassociated while in the idle mode. In either case, the STA may respond to a wake-on event in a TIM while not associated with the access point.

The STA wakes up every wake-on interval to see whether there is wake-on event for the STA. If there is directed traffic for the STA, the AP will wake up the STA via the TIM using the (possibly expired) association ID. The AP maintains the idle state for the idle mode STA until the AP receives the exit idle mode request from the STA. If the AP tries to wake the STA, but the STA doesn't respond with an exit idle mode request frame, the AP may decide not to maintain the idle mode status for the STA anymore.

When the idle mode STA receives a wake-on event, the idle mode STA will wake up the host system. The Idle mode STA will send the exit idle mode request to the AP to exit idle mode. If the STA's key or association has expired, the idle mode STA will send re-association request and piggyback the exit idle mode request in the re-association request.

Figure 12:
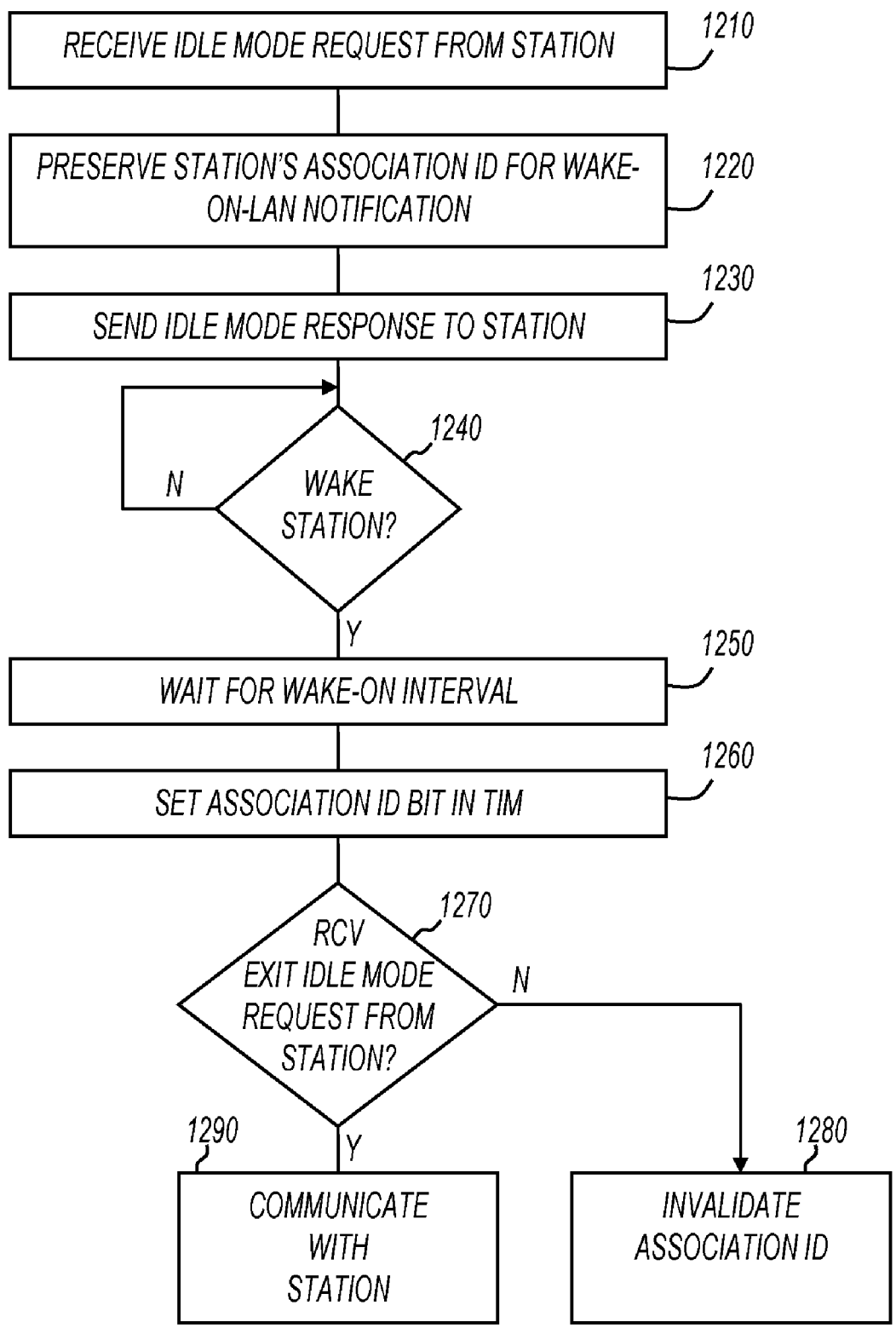
FIGS. 12 and 13 show flowcharts of method embodiments.

FIG. 12 shows a flowchart of actions taken by an access point. At 1210, the AP receives an idle mode request from the station. At 1220, the AP preserves the station's association ID for wake-on-LAN notification. At 1230, the AP send an idle mode response to the station.

After allowing the station to enter idle mode, the AP keeps track of the idle mode station by virtue of the preserved association ID. Prior to a wake-on event occurring, the association with the station may expire. The AP continues to keep track of the idle mode station even after the expiration of the association.

At 1240, the AP determines if there is a need to wake the station. If so, then the AP waits for the wake-on interval at 1250, and sets the bit in the TIM corresponding to the preserved association ID at 1260. If the AP receives an exit idle mode request from the station at 1270, the AP and station communicate normally at 1290. If no exit idle mode request is received, the AP invalidates the association ID at 1280. After 1280, the AP no longer keeps track of the station as being in idle mode.

Figure 13:
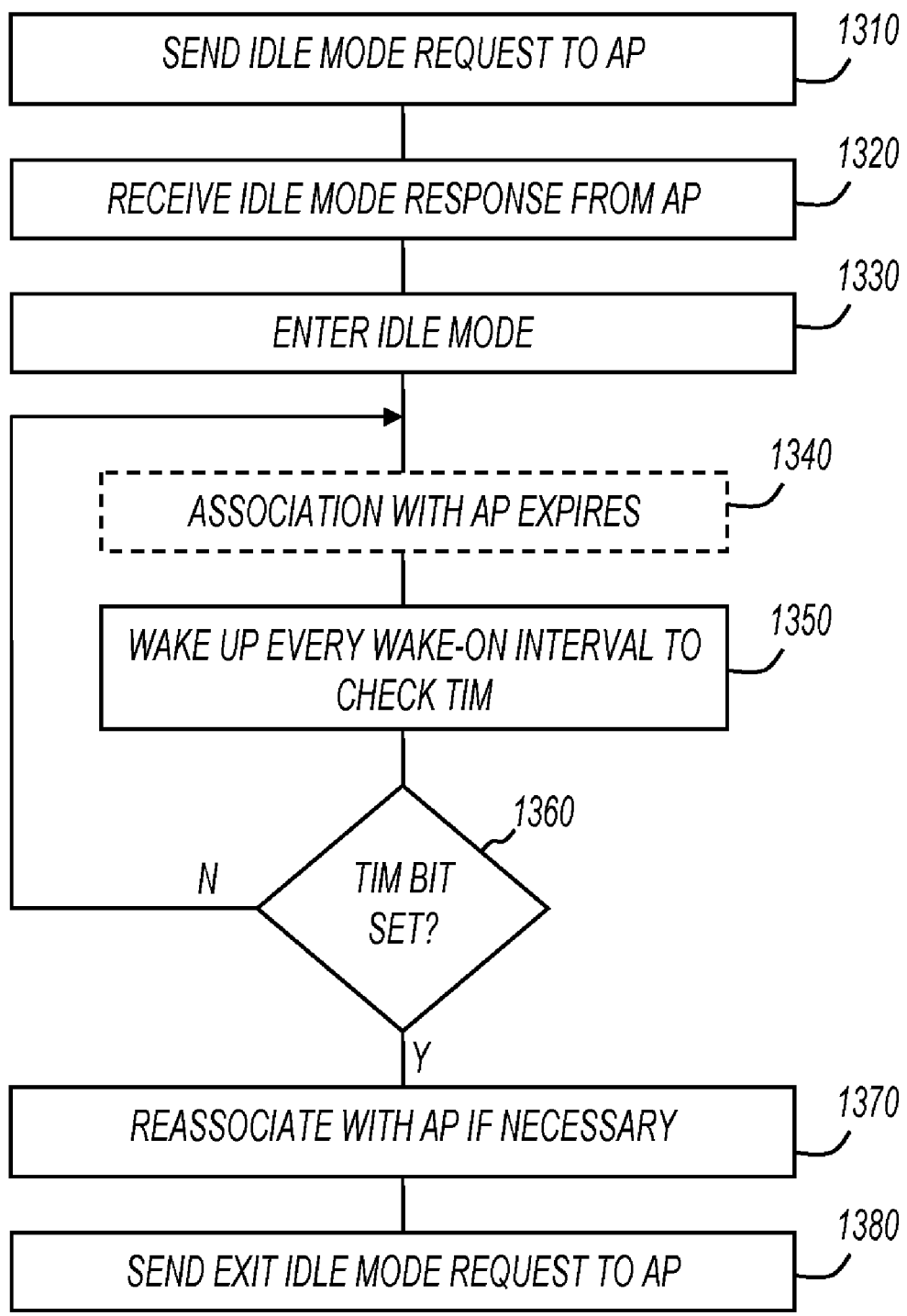

FIG. 13 shows a flowchart of actions taken by a station. At 1310, the station sends an idle mode request to the AP, at 1320, the station receives an idle mode response from the AP, and at 1330, the station enters idle mode. As described above, the idle mode request and idle mode response may include fields such as a wake-on interval. The wake-on interval may be expressed in a number of beacon intervals, and may be a large number to allow the station to remain in idle mode for significant periods, including long enough for the association with the AP to expire.

At 1340, the association with the AP expires. This block is shown with a dotted line to signify that the association may or may not expire depending on how long the station is in the idle mode before a wake-on event occurs. At 1350, the station wakes up every wake-on interval to check the TIM bit that corresponds to the association ID of the station at the time of the idle mode request/response at 1310/1320. The station checks this TIM bit even if the association has expired.

If the TIM bit is set, a wake-on-WLAN event has occurred. At 1370, the station reassociates with the AP if necessary, and at 1380, the station sends an exit idle mode request to the AP.

Wake-On-WLAN of Stationary Wireless STAs using PIM/TIM

Various embodiments of the present invention combine the PIM and TIM embodiments described above to provide further wake-on-WLAN functionality. For example, a STA may register for stationary paging when available, or may send an idle mode request to be brought out of the idle state by a TIM. In these embodiments, the wake-on-ID corresponds to either the paging ID used in the PIM or the association ID used in the TIM to provide the wake-on-WLAN function. For example, the wake-on-ID could be the STA's paging ID if the STA registers with the paging service, or could be the STA's current association ID if the STA doesn't register the paging service.

The STA wakes up every wake-on interval to see whether there is wake-on event for the STA. The wake-on interval is multiple beacon intervals, and is either the wake-on interval negotiated for the idle mode station (Idle Mode listen interval) or the paging interval if the STA registers the paging service.

To enter the idle state, the STA sends an idle mode request with an optional paging request element or wake-on interval field to the associated AP.

If a paging request is specified, the AP forwards the paging request to the paging service logical entity (paging controller). The paging service will assign a paging ID as a wake-On ID. If a paging request is not specified (only for stationary paging), the AP will use the current association ID as the wake-on ID and keep the association ID valid for the STA until the STA exits from idle mode.

The AP sends an idle mode response to the requesting STA including a paging ID if the paging request is specified in the idle mode request. Otherwise, AP responds an idle mode response frame without including a paging ID, and the AP will use the current association ID as the Wake-on ID and keep the association ID valid for the STA until the STA exits from idle mode.

The STA wakes up every wake-on interval to see whether there is wake-on event for the STA. If the STA has registered with the paging service, the STA will wake up every paging interval to check the paging indication message (PIM). Otherwise, the STA will wake up every wake-on interval check the TIM. If there is directed traffic for the STA, the AP will wake up the STA via the TIM (association ID) or the PIM (Paging ID).

The AP maintains idle state for idle mode STA until the AP receives exit idle mode request from the STA, or unsuccessful paging/wake-on operation. If the AP tries to page or wake the STA, but the STA doesn't respond with an exit idle mode request frame, the AP may decide not to maintain the idle mode status for the STA any more.

When the idle mode STA receives a wake-on event (or is paged), the idle mode STA will wake up the host system. The idle mode STA will send an exit idle mode request to the AP to exit idle mode. If the STA's key or association has been expired, the idle mode STA will send re-association request and piggyback the exit idle mode request in the re-association request.

Figure 14:
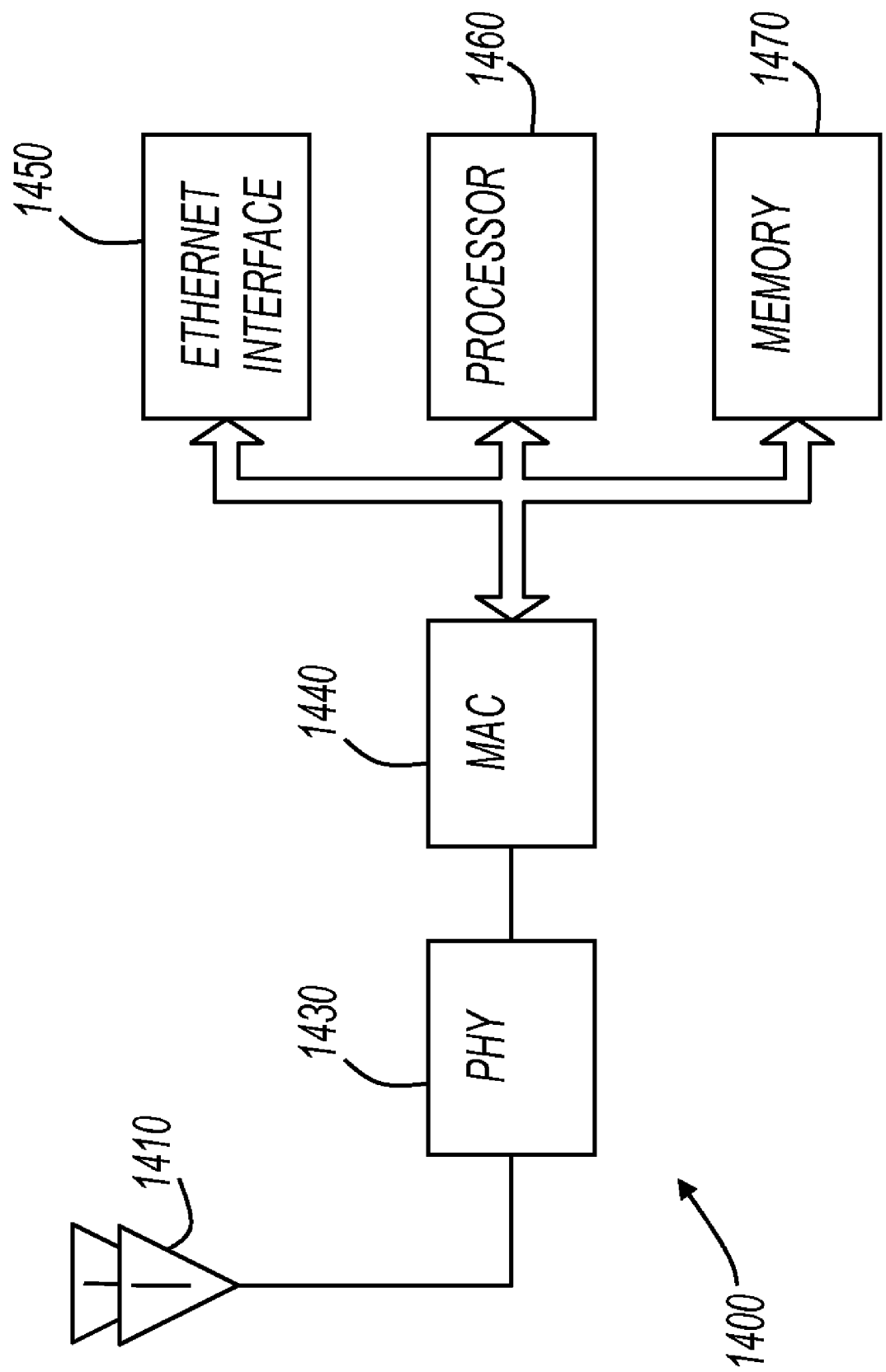
FIG. 14 shows a system diagram in accordance with various embodiments of the present invention.

FIG. 14 shows a system diagram in accordance with various embodiments of the present invention. Electronic system 1400 includes antennas 1410, physical layer (PHY) 1430, media access control (MAC) layer 1440, Ethernet interface 1450, processor 1460, and memory 1470. In some embodiments, electronic system 1400 may be a station capable operating in a stationary paging environment. In other embodiments, electronic system 1400 may be a station that checks a TIM for a wake-on event even after a current association with an access point has expired. For example, electronic system 1400 may be utilized in a wireless network as station 212 (FIG. 1). In some embodiments, electronic system 140 may be an access point such as access point 210 (FIG. 1). In these embodiments, electronic system 1400 may advertise stationary paging capabilities, or may keep track of an idle mode station even after the association with that station has expired.

In some embodiments, electronic system 1400 may represent a system that includes an access point or mobile station as well as other circuits. For example, in some embodiments, electronic system 1400 may be a computer, such as a personal computer, a workstation, or the like, that includes an access point or mobile station as a peripheral or as an integrated unit. Further, electronic system 1400 may include a series of access points that are coupled together in a network.

In operation, system 1400 sends and receives signals using antennas 1410, and the signals are processed by the various elements shown in FIG. 14. Antennas 1410 may be an antenna array or any type of antenna structure that supports MIMO processing. System 1400 may operate in partial compliance with, or in complete compliance with, a wireless network standard such as an 802.11 standard.

Physical layer (PHY) 1430 is coupled to antennas 1410 to interact with a wireless network. PHY 1430 may include circuitry to support the transmission and reception of radio frequency (RF) signals. For example, in some embodiments, PHY 1430 includes an RF receiver to receive signals and perform "front end" processing such as low noise amplification (LNA), filtering, frequency conversion or the like. Further, in some embodiments, PHY 1430 includes transform mechanisms and beamforming circuitry to support MIMO signal processing. Also for example, in some embodiments, PHY 1430 includes circuits to support frequency up-conversion, and an RF transmitter.

Media access control (MAC) layer 1440 may be any suitable media access control layer implementation. For example, MAC 640 may be implemented in software, or hardware or any combination thereof. In some embodiments, a portion of MAC 1440 may be implemented in hardware, and a portion may be implemented in software that is executed by processor 1460. Further, MAC 1440 may include a processor separate from processor 1460.

In operation, processor 1460 reads instructions and data from memory 1470 and performs actions in response thereto. For example, processor 1460 may access instructions from memory 1470 and perform method embodiments of the present invention, such as methods shown in FIGS. 9, 12, and 13, or methods described with reference to other figures.

Processor 1460 represents any type of processor, including but not limited to, a microprocessor, a digital signal processor, a microcontroller, or the like.

Memory 1470 represents an article that includes a machine readable medium. For example, memory 1470 represents a random access memory (RAM), dynamic random access memory (DRAM), static random access memory (SRAM), read only memory (ROM), flash memory, or any other type of article that includes a medium readable by processor 1460. Memory 1470 may store instructions for performing the execution of the various method embodiments of the present invention. Memory 1470 may also store one or more codebooks of beamforming matrices or beamforming vectors.

Although the various elements of system 1400 are shown separate in FIG. 14, embodiments exist that combine the circuitry of processor 1460, memory 1470, Ethernet interface 1450, and MAC 1440 in a single integrated circuit. For example, memory 1470 may be an internal memory within processor 1460 or may be a microprogram control store within processor 1460. In some embodiments, the various elements of system 1400 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 1450 may provide communications between electronic system 1400 and other systems. For example, in some embodiments, electronic system 1400 may be an access point that utilizes Ethernet interface 1450 to communicate with a wired network or to communicate with other access points. Some embodiments of the present invention do not include Ethernet interface 1450. For example, in some embodiments, electronic system 1400 may be a network interface card (NIC) that communicates with a computer (host system) or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    creating an association with an access point, the association being specified by an association ID;
    receiving a communication from the access point advertising stationary paging;
    sending a paging configuration request that includes a field to indicate the request is sent by a stationary station and that the stationary station may be paged within a coverage area of the access point wherein the access point acts as a paging server;
    entering an idle state;
    allowing the association with the access point to expire so that the association ID becomes an expired association ID; and
    periodically waking to check for a bit corresponding to the expired association ID in a IEEE 802.11 traffic indication map (TIM) for a wake-on event via a paging ID; and
    if there is a wake-on event for the stationary station:
        sending a request to exit the idle state; and
        if the association ID is an expired association ID, sending a reassociation request along with the request to exit the idle state.

2. A method comprising:
    advertising stationary paging capabilities to wireless stations wherein the access point acts as a paging server;
    receiving a paging configuration request that indicates the request is from a stationary station;
    responding to the request with a paging configuration response;
    preserving an association ID of the station beyond an expiration of an association with the station, the association ID becoming an expired association ID;
    setting a bit in a IEEE 802.11 traffic indication map (TIM) corresponding to the expired association ID to indicate the station is being paged wherein the expired association ID comprises a paging ID;
    in the event a reassociation request is received from the station along with an exit idle mode request, reassociating the station with an association ID; and
    otherwise terminating idle mode status for the station in the event an exit idle mode request is not received from the station.

3. An article comprising a non-transitory machine-readable medium adapted to hold instructions that when accessed result in a machine performing:
    creating an association with an access point, the association being specified by an association ID;
    receiving a communication from the access point advertising stationary paging;
    sending a paging configuration request that includes a field to indicate the request is sent by a stationary station and that the stationary station may be paged within a coverage area of the access point wherein the access point acts as a paging server;
    entering an idle state;
    allowing the association with the access point to expire so that the association ID becomes an expired association ID; and
    periodically waking to check for a bit corresponding to the expired association ID in a IEEE 802.11 traffic indication map (TIM) for a wake-on event via a paging ID; and
    if there is a wake-on event for the stationary station:
        sending a request to exit the idle state; and
        if the association ID is an expired association ID, sending a reassociation request along with the request to exit the idle state.

4. An electronic system comprising:
    an antenna;
    a physical layer coupled to the antenna;
    a media access control layer to advertise a stationary paging ability to stationary wireless stations wherein the access point acts as a paging server, and to:
    set a bit corresponding to the expired association ID in a IEEE 802.11 traffic indication map (TIM) to trigger a wake-on event wherein the expired association ID comprises a paging ID;
    reassociate the station with an association ID in the event a reassociation request is received from the station along with an exit idle mode request; and
    otherwise terminate idle mode status for the station in the event an exit idle mode request is not received from the station.

* * * * *